US000002005P2

(19) United States

(12) Statutory Invention Registration

Winby et al.

(10) Reg. No.: US H2005 H

(43) Published: Nov. 6, 2001

(54) PROCESS FOR LEACHING LOW SULPHUR CONTENT MATERIALS

(76) Inventors: Richard Winby, 4 Lovegrove Close, Mt. Claremont, W.A. 6010; Paul C Miller, 21 Finney Crescent, Marmion, W.A., 6020, both of (AU); Anthony Pinches, 253 Landi Street, Garsfontein 0042; Lenhart G Maritz, 11 Haakdoring Road, Randpark Ridge Extension 24, Randburg 2194, both of (ZA)

(21) Appl. No.: 09/345,657

(22) Filed: Jun. 30, 1999

(30) Foreign Application Priority Data

Jul. 1, 1998 (AU) ..... PP 4442

(51) Int. Cl.[7] ..... B01D 11/00

(52) U.S. Cl. ..... 423/27

(58) Field of Search ..... 423/27, DIG. 17

(56) References Cited

U.S. PATENT DOCUMENTS

| | | | | |
|---|---|---|---|---|
| 4,497,778 | * | 2/1985 | Pooley | 423/27 |
| 4,752,332 | * | 6/1988 | Wu et al. | 423/DIG. 4 |
| 4,987,081 | * | 1/1991 | Hackl et al. | 423/DIG. 17 |
| 5,246,486 | * | 9/1993 | Brierley et al. | 423/27 |
| 5,332,559 | * | 7/1994 | Brierley et al. | 423/27 |
| 5,429,659 | * | 7/1995 | Spencer et al. | 423/DIG. 17 |
| 5,462,720 | * | 10/1995 | Aragones | 423/27 |
| 5,763,259 | * | 6/1998 | Panos | 423/DIG. 17 |
| 5,914,441 | * | 6/1999 | Hunter et al. | 423/DIG. 17 |

OTHER PUBLICATIONS

Tuovinen, et al., "Use of Micro–Organisms for the Recovery of Metals" International Merallurgical Reviews, vol. 19, 1974.*

"Leaching of Marine Manganese Nodules by Acidophilic Bacteria growing on Elemental Sulfur" Konishi et al., Metallurgical and Materials Transactions B: Process Metallurgy and Materials Processing Science, v. 28, n. 1, Feb. 1997, p. 25–32.

"Bacterial Leaching of Cobalt–Rich Ferromanganese Crusts", Nakazawa et al., International Journal of Mineral Processing, Aug. 15, 1995, 43 (3–4), 255–265.

"Bacterial Leaching of Manganese Nodules", Nakazawa et al., Journal of the Mining and Materials Processing Institute of Japan, Jun. 1989, 105, (6), 470–474.

"Bioleaching of Rare Metals From Manganese Nodules by Thiobacillus Ferrooxidans", Satoru et al., Mineral Processing and Extractive Metallurgy Review, v. 15, n. 1–4, 1995, p. 140 (MPERES), no month.

"Bioleaching of Metals From Sewage Sludge by Sulfur–O-sidizing Bacteria", Blais et al., Journal of Environmental Engineering, v. 118, n. 5, Sep.–Oct. 1992, p. 690–707 (JOEEDU).

Chemical Abstract No. 482453 (1990): Leaching behavior and its mechanism for a chalcopyrite concentrate by Thiobacillus ferrooxidans, no month.

Chemical Abstract No. 474522 (1983): Environmental leaching behavior of copper–nickel bearing Duluth gabbro and flotation tailings, no month.

Chemical Abstract No. 514780 (1982): Microbial ecology of Rum Jungle. III. Leaching behavior of sulfidic waste material under controlled conditions, no month.

Chemical Abstract No. 484139 (1981): Bacterial leaching of synthetic copper and nickel sufides, no month.

* cited by examiner

*Primary Examiner*—Charles T. Jordan
*Assistant Examiner*—Aileen J. Baker

(57) ABSTRACT

Disclosed is a process for leaching low sulphur materials for recovery of metals contained in them. The process includes leaching a first low sulphur material containing metal values with a leaching agent produced by bacterial oxidation of a second material by bacterial action thereby liberating metal values from the first material by a substantially indirect bioleaching process.

17 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR LEACHING LOW SULPHUR CONTENT MATERIALS

FIELD OF THE INVENTION

This invention relates to the leaching of low sulphur ores.

BACKGROUND OF THE INVENTION

There are large reserves of so-called secondary ores containing base and precious metals which it would be desirable to recover. Such secondary ores include oxides, sulphates and partially oxidised or weathered sulphides. The ores may be complex containing portions of sulphide, sulphate, oxide and weathered sulphide, any of which may require a different kind of hydrometallurgical treatment to enable the recovery of metals from the particular one. Nevertheless, whatever the geology, the sulphur content of the ore is much less than would be encountered with a massive sulphide orebody. Accordingly, such ores may be described as "low sulphur ores". Secondary ores of copper including antlerite, brochantite, malachite and other mineral types, typically reflect an association of small amounts of copper sulphide minerals with a large amount of carbonate or oxide minerals. Weathered or partially oxidised sulphides may also be present within the ore. Other base metals exhibit similar oxidised mineralogy, for example lead and zinc.

Generally, such ores may be treated to separate sulphides and the other secondary minerals present. The secondary minerals are not amenable to pyrometallurgical treatment as gangue heating and slag handling requirements are too high. Such costs dictate a hydrometallurgical route to recovery which may involve treatment by a process which involves acid leaching, such being basically the only hydrometallurgical route to recovery. The economics of acid leaching of course will vary with the location of the ore body and proximity to sources of acid producing materials such as sulphide ores, pyrites or sulphur. Nevertheless, in some locations, there will be no source of acid producing material and it may be necessary to plan on the basis that sulphuric or sulphurous acid will require to be imported to the site. The transportation and material costs of pursuing this option may be sufficiently high that the proposed project remains unviable even though on a grade basis the resource would be attractive to develop. The problem may be increased by the acid consuming nature of carbonate minerals that increase acid costs and further impact on economic viability.

Other ores, such as the refractory ores, may include appreciable content of precious metals such as gold and silver. Such ores are also low sulphur ores and as described in U.S. Pat. No. 5,246,486 may have a sulphur content of 0.2 to 0.3%. Thus only a limited extent of bacterial leaching is possible, and such ores need to be subjected to cyanidation or other hydrometallurgical treatment for the liberation of the precious metals.

SUMMARY OF THE INVENTION

It is the object of the present invention to provide a hydrometallurgical route to the recovery of metals from low sulphur ores containing them which avoids, to the maximum possible extent, the costly import of leaching acid. The "low sulphide materials" of particular interest contain the oxides, sulphates and weathered sulphides of the base metal family.

With this object in view, the present invention provides a process for leaching low sulphur materials for recovery of metals contained in them comprising leaching a first low sulphur material containing metal values with a leaching agent produced by bacterial oxidation of a second material with sulphur oxidising bacteria thereby liberating metal values from the first material by a substantially indirect bacterial process.

Typical low sulphur materials to be treated by such a process would be the oxide, sulphate and partially oxidised or weathered sulphide ores of base metals such as copper, cobalt, lead, zinc and nickel and mixtures thereof. Such ores may contain an appreciable quantity of carbonate minerals but have a sulphur content lower than would be necessary to achieve an economically appreciable extent of metal leaching by bacterial action in the absence of the second material. Typical sulphur content of the low sulphur content material is between 0 and 10% by weight.

The first material could be the low sulphur ore itself, a mixture of low sulphur materials, perhaps a mixture of different low sulphur ores, or could be a concentrate or residue of another metallurgical process which is low sulphur in content but still containing an appreciable metal content. Slags, concentrates, tailings and other metallurgical materials such as residues from electrolytic zinc plants, may be suitable for treatment by the process of the invention. The material may be primary crushed or subjected to secondary size reduction. Any size reduction should be to a size range that allows effective heap or dump or other leaching especially reactor leaching, for example leaching in stirred tank(s). Aeration costs in the latter case may affect process economy.

The first material may include iron as iron oxides or sulphides, typically in a range of 0% to 40% by weight. Action of the leaching agent or bacteria on the first material may liberate ferric ion which may itself act as a leaching agent.

The second material is selected such that bacterial action on that material produces a leaching agent. Most advantageously, bacterial action on the material by sulphur oxidising bacteria produces sulphuric or sulphurous acid, a conventional leaching agent. Materials that meet this criterion include elemental sulphur, most preferred in the case of the present invention since it will introduce a minimal level of impurities, as well as sulphuric acid by bacterial oxidation, into the leaching process. Milled or unmilled sulphur could be employed. Sulphur particles may be agglomerated using a suitable agglomerating agent, as discussed.

The second material may itself be a mixture of materials. The key constituent of the mixture will be a mineral or material which may be bacterially oxidised to produce the desired acid requirement of the process. Mixtures of sulphides and low sulphur content materials could be used, the rich sulphur materials reducing the necessary sulphur addition to promote indirect bacterial oxidation. Other materials could be used such a pyrite or pyrrhotite though these will introduce iron into the process and this may be undesirable. Nevertheless, a controlled proportion of ferric ion produced by bacterial action could be desirable being an effective leaching agent.

The second material must be employed in such amount, relative to the quantity of the first material, that a sufficient amount of acid will be available to dissolve the required quantity of metals from the first material. Particularly where the first material includes carbonate or other acid consuming minerals or materials, the quantity of second material should include a component, which when converted to acid, is sufficient to at least neutralise the acid consuming minerals or materials. The required quantity, taken into combination with the achieved extraction, will be at least that to make the treatment scheme economically viable.

The second material may be combined, or not, with the first material dependent upon the desired process design. For example, the first material could be slurried and the second material, say sulphur, added in a process suitable to be conducted in one or more continuous stirred tank reactors. Batch reactors could also be used.

The first and second materials could be mixed prior to being formed into a heap or dump for a heap, dump or other percolation leaching process. The first and second materials could be arranged in layers or otherwise in proximity such that bacterial action on the second material produces the leaching agent for the first. Alternatively, the second material could be bacterially treated in a separate stage, the leaching agent generated being transferred to the first material leaching stage. Thus the heap of the first material could be irrigated with an acidic liquor guaranteed by bacterial oxidation of the second material. Of course, the leaching agent could be supplied to a continuous stirred tank reactor system for example.

The second material need not be processed in any way prior to use. Elemental sulphur of relatively low grade may be employed without the need for preliminary acid washing or other processing steps. It may be added to the first material in any desired manner, for example at any desired rate. Generally, the commencement of mixture with the first material would be prior to the commencement of leaching since an economically effective extent of leaching in terms of liberation of metals from the ore cannot be achieved until a substrate oxidisable to acid in sufficient quantity is available to the microorganisms.

The process is to be contrasted with a conventional leaching mechanism where a base metal sulphide material is directly leached, the leached particles being coated with elemental sulphur or hydrous sulphates. Such coatings are considered inimical to effective leaching and as much to be avoided in accordance with the proposed process as in conventional practice.

Suitable acidophilic microorganisms to be employed in the process include mesophilic sulphur oxidising bacteria including thiobacilli such as *Thiobacillus thiooxidans* and/or other bacteria such as leptospirilli. Such mesophiles are most effective at temperatures below 40° C., more preferably 35° C. Therefore, employment of such organisms may result in the need for cooling systems to remove the heat produced by oxidation of sulphur. More preferably, the microorganisms may be thermophilic sulphur oxidising bacteria. Thermophilic bacteria, especially those that maintain viability at temperatures in the approximate range 50° C. to 90° C., may also be employed. Organisms such as Sulpholobus may be suitable for this. The employment of thermophilic organisms reduces the need for cooling systems but also, because the bacterial oxidation may occur at a higher temperature, leaching rates may be accelerated further improving the economics of the process.

The microorganisms may be introduced by inoculum or otherwise and used in mixed culture and may include species not yet identified.

The introduction of the second material or sulphur should be in such amount as to maintain an optimum pH, typically from 2.0 to 2.5, to sustain the microorganisms and maintain leaching efficiency once bacterial oxidation has commenced. If leachate recirculation is practiced, the leachate may be conditioned as appropriate to ensure that pH is maintained in the optimum range.

The microorganisms are supplied with other nutrient requirements in addition to the energy source being elemental sulphur or pyrite. The microorganisms require carbon source and minerals in addition to sulphur.

The leachate may be treated in any conventional manner for recovery of metals by solvent extraction, ion exchange, cementation, precipitation or otherwise.

The leach residue may be disposed of in any desired manner which is environmentally acceptable or subjected to further chemical or biological treatment stages to optimise metal recovery.

The preferred heap or dump should be constructed with optimum hydraulic characteristics for achieving maximum liquid-solid contact and more effective leaching. The hydraulic characteristics may also affect achievement of desired temperature range within the heap or dump. This is also important to oxygen transfer and provision may be made for additional aeration though this may adversely affect process economics.

BRIEF DESCRIPTION OF THE DRAWINGS

The invention may be more fully appreciated from the following description of preferred embodiments thereof made with reference to the accompanying drawings in which.

DETAILED DESCRIPTION OF PREFERRED EMBODIMENTS OF THE INVENTION

In each of the embodiments, and solely for the purposes of illustration, the first material is a secondary copper ore and the second material is sulphur. The secondary copper ore has a sulphur content sufficiently low that economical conventional bioleaching would not be possible due to minimal extraction of copper and other values from the ore. The conventional treatment scheme for such an ore would involve acid leaching, notably with sulphuric acid. The pregnant liquor would be subjected to solvent extraction and electrowinning for recovery of copper metal and other values.

Similar schemes may be envisaged for secondary ores of the base metals zinc, cobalt, lead and nickel or slags, residues or tailings containing those metals.

Figure 1:
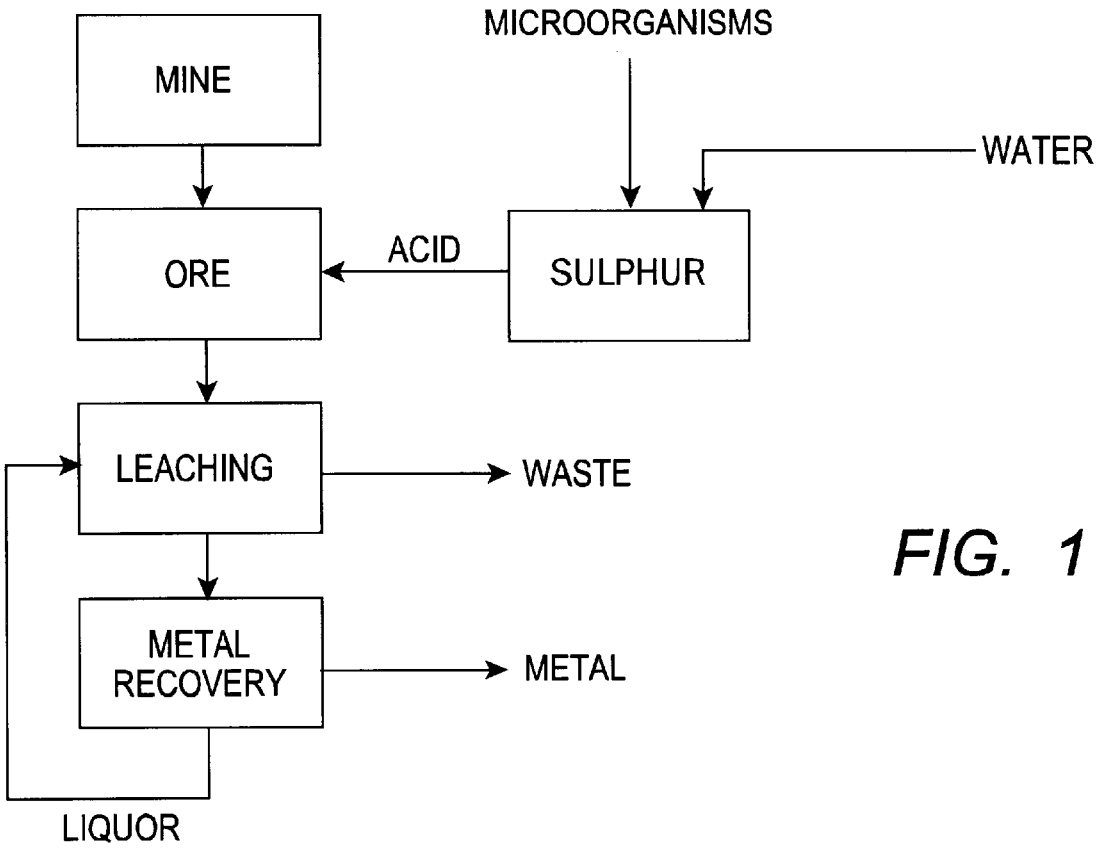
FIG. 1 is a generalised flowsheet for a process conducted in accordance with a first embodiment of the invention.

Referring now to FIG. 1, the secondary copper ore is mined, crushed in a primary crusher, subjected to further size reduction as appropriate, and brought into contact with sulphur of industrial grade employed without pre-treatment. Water and bacteria are brought into contact with sulphur at least and, by bacterial oxidation, the added sulphur is oxidised into sulphuric acid which is then available to attack and dissolve the secondary copper ore, notably liberating copper. The dissolution may be hindered by the presence of acid consuming minerals, such as carbonates, or other materials present within the ore at the leach stage. Therefore, sufficient sulphur must be introduced to not only provide the acid requirement for dissolution of the material but also to compensate for the neutralising effect of the acid consuming materials. Therefore, the sulphur addition to the leach stage will be calculated taking into account the following factors:

1. The sulphide sulphur content of the first material.
2. The acid consuming mineral/material or "carbonate" content of the first material.

The interplay between these factors may be understood by consideration of the following reaction schemes which show the acid generating and acid consuming reactions which may be occurring within the leaching stage.

Acid Generation $$5i + 1\tfrac{1}{2} + H_2O \xrightarrow{\text{bacteria}} H_2SO_4$$

Acid Consumption $$2FeSO_4 + \tfrac{1}{2}O_2 + H_2SO_4 \xrightarrow{\text{bacteria}} Fe_2SO_4$$

$$MS + Fe_2(SO_4)_3 \xrightarrow{\text{bacteria}} MSO_4 + 2FeSO_4 + Si$$

$$CaCO_3 + H_2SO_4 \xrightarrow{\text{bacteria}} CaSO_4 + H_2O + CO_2$$

$$MO + H_2SO_4 \xrightarrow{\text{bacteria}} MSO_4 + H_2O$$

where

M is a metal such as zinc, copper, cobalt, nickel or lead.

Figure 2:
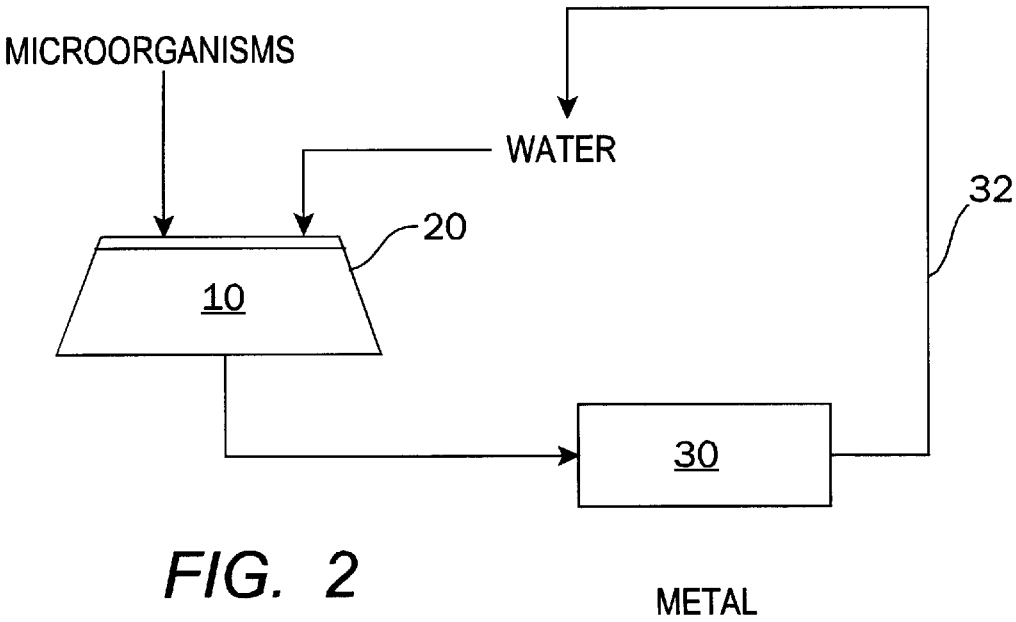
FIG. 2 is a flowsheet of a dump or heap leaching process conducted in accordance with a second embodiment of the invention.

FIG. 2 shows a layout of a heap or dump 10 in which the process is conducted. A layer 20 of industrial grade sulphur, exposed to air, is placed over the heap or dump 10 of ore. Water containing sulphur-oxidising microorganisms may then be sprayed or trickled onto the heap or dump 10 effectively irrigating or percolating through it. Microorganisms could be otherwise introduced. Sulphuric acid formed by bacterial oxidation of the industrial grade sulphur dissolves the ore. The metal value containing solution is then treated for metal recovery at metal recovery stage 30. Barren liquor 32 may be recirculated to heap 10 and trickled onto the heap 10 alone or in combination with water. In another embodiment, the ore and sulphur may be arranged in several layers.

A heap or dump 10 may be constructed in which the sulphur and ore are simply mixed together and irrigated as above. Mixing may be done when building the heap or by introduction of sulphur to the ore at the mine or processing site.

Figure 3:
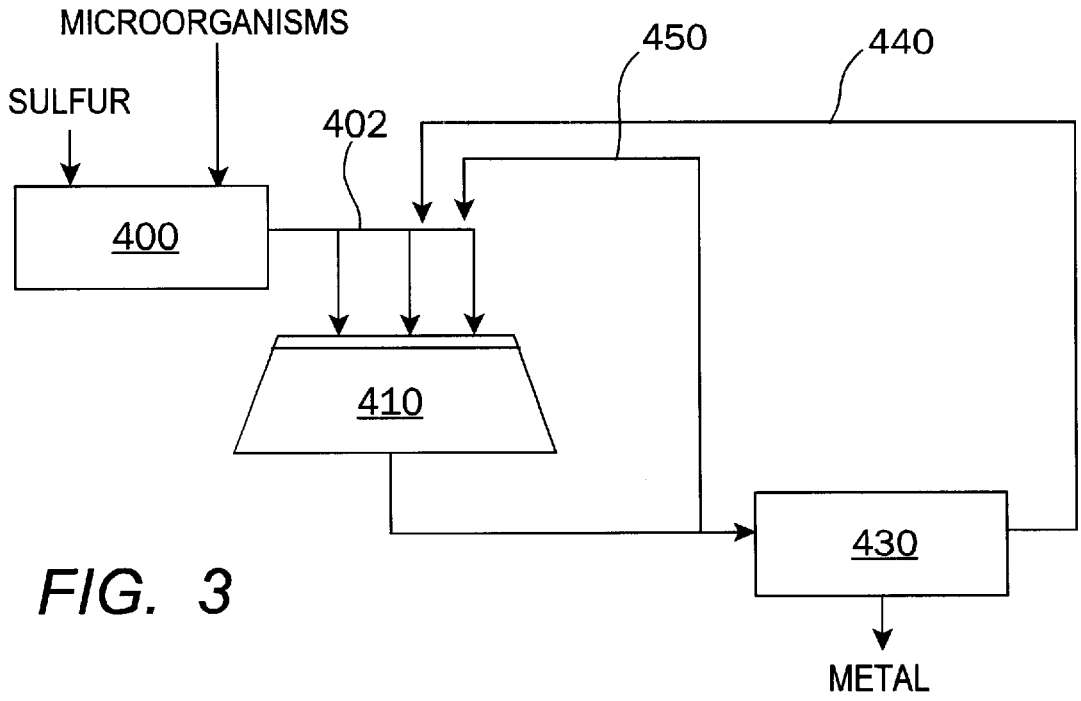
FIG. 3 is a flowsheet of a dump or heap leaching process conducted in accordance with a third embodiment of the invention.

FIG. 3 shows a microbial oxidation stage 400 in which sulphur is slurried with water and subjected to microbial action for production of sulphuric acid stream 402 which is then employed to irrigate a heap or dump 410 to solubilise metals contained therein. Air or oxygen may require to be introduced to the microbial oxidation stage 400 to ensure that the microorganisms have sufficient oxygen to enable the microbial oxidation reaction to proceed. Addition of sulphur is controlled such that the pH of the oxidation stage 400 is maintained within tolerance for the microorganism, ideally within the range 2.0 to 2.5. Other pH control may be employed as appropriate. A base agent may be employed, if necessary, at the outlet from the microbial oxidation stage 400 to maintain pH of the acid stream 402 within acceptable limits.

The quantity of sulphur introduced to the oxidation stage 400 also dictates the reactor temperature as, being exothermic, the sulphur oxidation reaction liberates heat. Cooling may be provided for as the temperature must be maintained within the limits of bacterial viability. The bacterial culture may be selected to reduce the cooling requirement.

It will be understood that the leaching stage need not be conducted heap or dumpwise. The acid produced by bacterial action, perhaps supplemented if absolutely necessary, could be supplied to any form of leaching stage formed of stirred tanks, vats, pachuca tanks or otherwise. Acid may be recycled by line 450 as shown in the diagram with a portion, or all, of the acid stream being treated for recovery of metals at metal recovery state 430. Barren liquor 440 from metal recovery stage 430 may also be recirculated to the heap 410.

Figure 4:
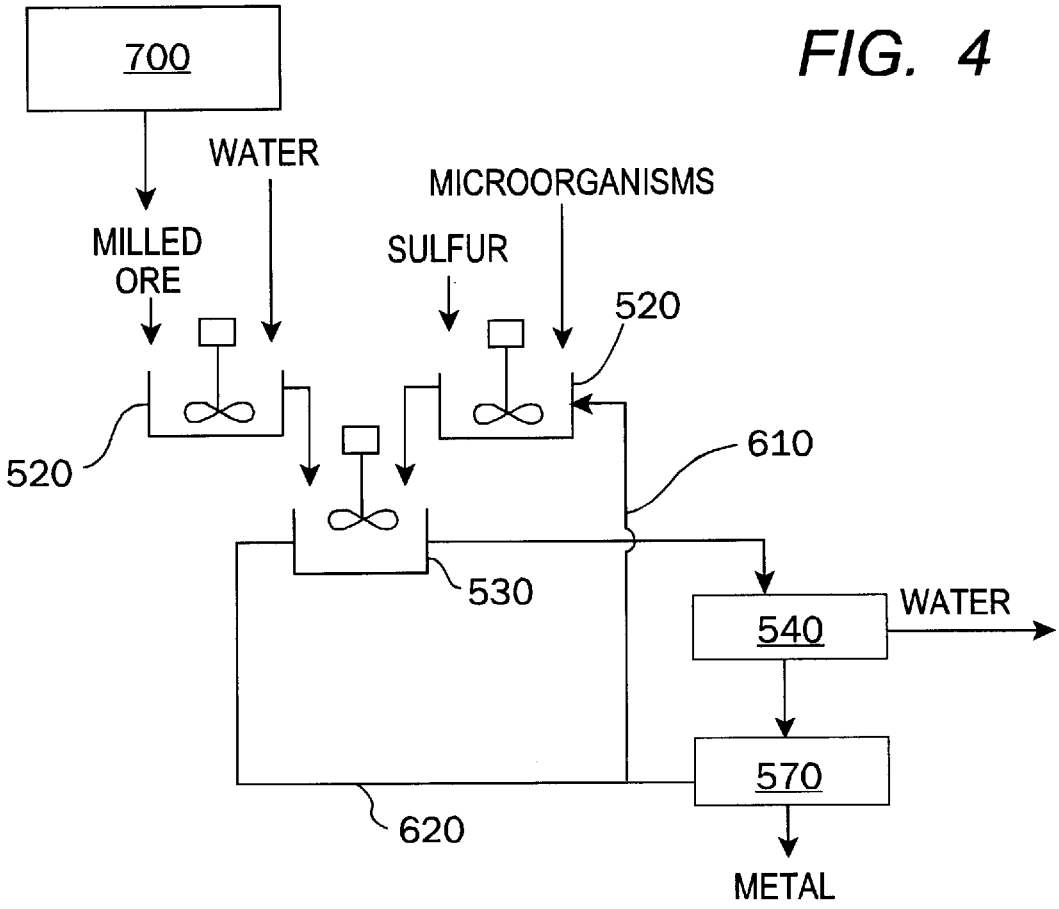
FIG. 4 is a flowsheet of a stirred reactor process conducted in accordance with a fourth embodiment of the invention.

FIG. 4 shows how the process may be conducted in a system of continuous stirred tank reactors, which may be operated in batch or continuous operating mode. Agitation speed is selected to promote the reaction without, in the case of the mincobial reactor, damaging microorganisms. Agition methodology is also appropriately selected and may employ agitation by diffusing of gases. Speed and methodology may vary between the tanks. The diagram is not intended to place restrictions on the number of tanks that may be employed in the process. Rather the tanks may be seen as modules of sufficient number and layout of tanks to allow the process to proceed efficiently. This aspect is a matter of engineering design.

In slurry tank 520, low sulphur ore or other material is slurried with water, the slurry being provided to reaction tank 530. Sulphur and water are slurried in microbial oxidation tank 510. Microbial oxidation occurs in tank 510 to form sulphuric acid stream 560. Finely ground ore or metal containing material is supplied to reaction tank 530 from size reduction stage 700 which may involve crushing and milling. Also supplied to reaction tank 530 is an acid stream 590 produced in sulphur oxidation tank 510 to allow leaching of the low sulphur ore.

From reaction tank 530, a stream 580 containing metals liberated in the leaching process by sulphuric acid, and possibly ferric ion, is subjected to solid/liquid separation stage 540, the solids may be discarded or recycled for further treatment. A clarified liquor 600 is treated for recovery of metals at stage 570. A portion 610 of the liquid may be recycled, as desired, to the sulphur oxidation tank 520 or reaction tank 530.

The diagrams show number of ways in which the process of the invention may be conducted but other reactor configurations and layouts are possible. Cost may be determinative of the layout or configuration of reactors, leach and oxidation stages.

SULPHUR BIOLEACH COLUMN

The following results show comparative testing of the leaching of a secondary copper ore using the method of the invention. The ore consisted mainly of Fe-oxides (magnetite and hematite) and iron hydroxides in association with copper minerals. Most copper occurred in the ore as enriched secondary Fe-Mn-Pb-Zn-Cu hydroxide phases surrounding or along cracks within the magnetite and hematite. The copper also occurred as enriched secondary Fe-Mn-Pb-Zn-Cu hydroxide phases surrounding Fe-oxides. A few grains of Cu-As-Zn hydroxides were also identified. Cuprite was also observed as small irregular grains. Traces of chalcopyrite were identified attached to or as inclusions within magnetite. Galena and sphalerite were observed as rare small gains.

The particle size distribution of milled ore was as follows:

| Fraction | Mass % |
|---|---|
| +40 mm | 27.1 |
| −40 + 20 mm | 21.5 |
| −20 + 10 mm | 8.2 |
| −10 + 5 mm | 12.2 |
| −5 mm + 250 micron | 15.1 |

-continued

| Fraction | Mass % |
|---|---|
| −250 + 75 micron | 5.7 |
| −75 micron | 10.3 |

Experiments were conducted using conventional experimental column techniques, in a column 1.0 meter high by 0.12 meter diameter irrigated at 2.7 liters per day (10 L/m$^2$/hr), with water acidified to pH/2 with sulphuric acid, except columns 3 and 4 in which acidified raffinate from a copper solvent extraction circuit was employed instead. The copper content of the raffinate stream was 0.05–0.5 g/L.

SUMMARY OF OPERATING CONDITIONS & RESULTS FOR SULPHUR BIOLEACH COLUMN TESTWORK

| Experimental Set-up & Column Reference | Particle Size Of Materials (mm) | Agglomeration Method & Ingredients | Mode of operation Open/Closed | Inoculum Used? | pH Value | Days of Operation | Net Acid Generated | Copper Leached (%) | Sulphur Oxidised (%) |
|---|---|---|---|---|---|---|---|---|---|
| Unmilled sulphur | | | | | | | | | |
| Column A 150 g sulphur | Sulphur: <13 | None | Open circuit I | Yes | 1.8 | 158 | 122 | N/A | 27 |
| Column B 750 g sulphur | Sulphur: <13 | None | Open circuit I | Yes | 1.8 | 158 | 339 | N/A | 15 |
| Column C 1500 g sulphur | Sulphur: <13 | None | Open circuit I | Yes | 1.8 | 158 | 560 | N/A | 12 |
| Milled Sulphur | | | | | | | | | |
| Column D | Sulphur: −0.25 Silica: 5 | Silica sand/water 1% sulphur (150 g) | Open circuit | Yes | 1.8 | 99 | 505 | N/A | 100 |
| Column E | Sulphur: −0.25 Silica: 5 | Silica sand/water 5% sulphur (750 g) | Open circuit | Yes | 1.8 | 126 | 2349 | N/A | 100 |
| Column F | Sulphur: 0.25 Silica: 5 | Silica sand/water 10% sulphur (1500 g) | Open circuit | Yes | 1.8 | 126 | 4766 | N/A | 100 |
| Ore/sulphur | | | | | | | | | |
| Column 1 | Ore: −13 Sulphur: −0.25 | 5% sulphur (750 g) Water | Close circuit to pH 2 Inoculate Open circuit | Yes | 1.5 | 144 | 909 | 64 | |
| Column 2* | Ore: −13 Sulphur: −0.25 | 5% sulphur (750 g) Water | Close circuit to pH 2 Open circuit | No | 1.5 | 98 | −311 | 56 | |
| Column 3 | Ore: −13 Sulphur: −0.25 | 5% sulphur (750 g) Raffinate/Inocolum (3:1) | Open circuit | Yes | 1.5 | 168 | −181 | 67 | |
| Column 4 | Ore: −13 Sulphur: −0.25 | 5% sulphur (750 g)/ Inoculum Conditioned for 24 hrs | Open circuit | Yes | 1.5 | 107 | −217 | 67 | |
| Ore only | | | | | | | | | |
| Column 1 | Ore: −13 | Water | Close circuit to pH 2 Open circuit | No | 1.0 then 1.5 | 84 | −375 | N/D | |
| Bottle Roll | Ore: −2 | Water | N/A | No | 1.5 | N/A | −498** | 57 | |

*Column 2 was the reference column
All columns irrigated at 2.7 L/day (10 L/m 2/hr)
All columns irrigated with Acidified water except 3 & 4 in which acid rafinate was used.
**Adjusted to equivalent weight for comparison with columns The table particularly shows column results for three cases where an inoculum was used and one case where no inoculum was used. The latter reference test was conducted in column 2. In that case, copper extraction was substantially less than achieved using the inoculum. This table shows, first of all, how much net acid is generated from columns containing milled and unmilled sulphur using an inoculum of mesophilic sulphur oxidising bacteria growing on copper sulphide ores and concentrates over a number of years and used by Mintek, South Africa for the experimentation. The inoculum includes Thiobacillus type rods and leptospirillum type cells. Net acid generation allows for loss of acid to acid consuming minerals within the secondary copper ore.

Modifications and variations may be made to the invention as described herein on consideration of the disclosure by the skilled reader. Such modifications and variations are intended to be within the scope of the present invention.

What is claimed is:

1. A process for leaching low sulphur content materials for recovery of metals contained in them comprising:

leaching a first low sulphur content material containing metal values with a leaching agent produced by bacterial oxidation of a second material thereby liberating metal values from the first material.

2. The process of claim 1, wherein said low sulphur content material is selected from the group of oxides, sulphates, partially oxidized weathered sulphide ores of base metals, and mixtures thereof.

3. The process of claim 2, wherein said base metal is selected from the group consisting of copper, cobalt, lead, zinc, nickel and mixtures thereof.

4. The process of claim 1, wherein said first low sulphur content material is selected from the group consisting of a low sulphur ore, a mixture of low sulphur materials, a mixture of low sulphur ores, a low sulphur content concentrate and a low sulphur content residue.

5. The process of claim 4, wherein said low sulphur content concentrate or low sulphur content residue is selected from the group consisting of slags, concentrates, tailings, and residues.

6. The process of claim 1, wherein said first low sulphur content material includes iron.

7. The process of claim 1, wherein said second material is sulphur.

8. The process of claim 1, wherein said second material is a mixture of a sulphide and a low sulphur content material.

9. The process of claim 1, wherein relative amounts of said first low sulphur content material and said second material are controlled to generate a controlled amount of acid for metal dissolution from said first material.

10. The process of claim 9, wherein said amount of second material accounts for the content of acid consuming minerals in said first low sulphur content material.

11. The process of claim 1, wherein said first low sulphur content materials and said second materials are mixed together.

12. The process of claim 1, wherein said leaching process is a heap leaching process and said first low sulphur content materials and second materials are arranged in layers.

13. The process of claim 12, wherein said first low sulphur content materials and second materials are formed into a heap.

14. The process of claim 1, wherein said leaching process is conducted in at least one continuous stirred tank reactor.

15. The process of claim 1, wherein said bacterial oxidation is conducted by sulphur oxidizing bacteria selected from the group consisting of mesophilic bacteria and thermophilic bacteria.

16. A process for leaching a secondary base metal containing material having sulphur content less than 10% by weight, comprising:

(a) forming a leaching agent by bacterial oxidation of sulphur; and (b) reacting said secondary base metal containing material with said leaching agent formed by bacterial oxidation of sulphur; and (c) recovering said base metal.

17. A process for leaching a secondary base metal containing material having sulphur content less than 10% by weight, comprising:

(a) mixing milled elemental sulphur with a milled base metal mineral containing material to form a mixture;

(b) introducing sulphur oxidizing bacteria to said mixture by percolation such that said sulphur is oxidized to form an acidic leaching agent;

(c) liberating base metal from said mixture by leaching of the base metal mineral components with said acidic leaching agent; and (d) recovering said base metal.

* * * * *